United States Patent
Todoroki et al.

(10) Patent No.: US 9,851,963 B2
(45) Date of Patent: Dec. 26, 2017

(54) IN-VEHICLE DEVICE, MOBILE TERMINAL, INFORMATION MANAGEMENT DEVICE AND INFORMATION COMMUNICATION SYSTEM

(71) Applicants: Chihaya Todoroki, Nissin (JP); Hiroaki Sekiyama, Koto-ku (JP); Masato Endo, Nagoya (JP); Takayuki Sumiya, Nagoya (JP)

(72) Inventors: Chihaya Todoroki, Nissin (JP); Hiroaki Sekiyama, Koto-ku (JP); Masato Endo, Nagoya (JP); Takayuki Sumiya, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 31 days.

(21) Appl. No.: 14/411,244

(22) PCT Filed: Aug. 16, 2013

(86) PCT No.: PCT/IB2013/001787
§ 371 (c)(1),
(2) Date: Dec. 24, 2014

(87) PCT Pub. No.: WO2014/030044
PCT Pub. Date: Feb. 27, 2014

(65) Prior Publication Data
US 2015/0227359 A1    Aug. 13, 2015

(30) Foreign Application Priority Data
Aug. 22, 2012  (JP) ................. 2012-183127

(51) Int. Cl.
*G06F 9/44*    (2006.01)
*G06F 7/00*    (2006.01)
(Continued)

(52) U.S. Cl.
CPC ............... *G06F 8/65* (2013.01); *H04L 67/12* (2013.01); *H04M 1/72525* (2013.01); *H04W 8/24* (2013.01); *H04M 1/6083* (2013.01)

(58) Field of Classification Search
CPC ....................................................... G06F 8/65
(Continued)

(56) References Cited

U.S. PATENT DOCUMENTS 5,892,683 A * 4/1999 Sung ................. G06F 17/5054
703/27
2005/0193387 A1   9/2005 Uramatsu et al.
(Continued)

FOREIGN PATENT DOCUMENTS

JP    2004 326689    11/2004
JP    2005 228009     8/2005
(Continued)

OTHER PUBLICATIONS

International Search Report dated Mar. 20, 2014 in PCT/IB13/001787 Filed Aug. 16, 2013.

*Primary Examiner* — James D Rutten
(74) *Attorney, Agent, or Firm* — Oblon, McClelland, Maier & Neustadt, L.L.P.

(57) ABSTRACT

An information communication system includes an in-vehicle device mounted on a vehicle and a mobile terminal connected to the in-vehicle device so as to be able to cooperate with the in-vehicle device. In the information communication system, when a first software module embedded in the mobile terminal has been updated, a second software module embedded in the in-vehicle device is updated on the basis of software information about the updated first software module.

10 Claims, 5 Drawing Sheets

(51) Int. Cl.
  *G06F 9/445* (2006.01)
  *H04M 1/725* (2006.01)
  *H04L 29/08* (2006.01)
  *H04W 8/24* (2009.01)
  *H04M 1/60* (2006.01)

(58) Field of Classification Search
  USPC .................................................. 717/169
  See application file for complete search history.

(56) References Cited

U.S. PATENT DOCUMENTS

| | | | |
|---|---|---|---|
| 2006/0136892 A1* | 6/2006 | Branch | G06F 8/65 717/168 |
| 2007/0287439 A1 | 12/2007 | Weyl et al. | |
| 2008/0007120 A1 | 1/2008 | Weyl et al. | |
| 2009/0217257 A1* | 8/2009 | Huang | G06F 8/65 717/168 |
| 2010/0037057 A1 | 2/2010 | Shim et al. | |
| 2011/0093135 A1 | 4/2011 | Moinzadeh et al. | |
| 2011/0093136 A1 | 4/2011 | Moinzadeh et al. | |
| 2011/0093137 A1 | 4/2011 | Moinzadeh et al. | |
| 2011/0093154 A1 | 4/2011 | Moinzadeh et al. | |
| 2011/0093846 A1 | 4/2011 | Moinzadeh et al. | |
| 2012/0046808 A1 | 2/2012 | Furuta | |
| 2013/0141227 A1 | 6/2013 | Murata et al. | |
| 2013/0197712 A1* | 8/2013 | Matsuura et al. | B60R 25/24 701/1 |

FOREIGN PATENT DOCUMENTS

| | | |
|---|---|---|
| JP | 2006 11717 | 1/2006 |
| JP | 2008 185520 | 8/2008 |
| JP | 2010 191786 | 9/2010 |
| JP | 2010 282385 | 12/2010 |
| JP | 2012 43253 | 3/2012 |
| JP | 2012 43346 | 3/2012 |
| JP | 2012 91755 | 5/2012 |
| WO | 2006 063601 | 6/2006 |

* cited by examiner

IN-VEHICLE DEVICE, MOBILE TERMINAL, INFORMATION MANAGEMENT DEVICE AND INFORMATION COMMUNICATION SYSTEM

BACKGROUND OF THE INVENTION

1. Field of the Invention

The invention relates to a technique for updating software modules respectively embedded in an in-vehicle device and a mobile terminal that are connected so as to be able to cooperate with each other.

2. Description of Related Art

Japanese Patent Application Publication No. 2004=326689 (JP 2004-326689 A) describes a system for updating a software module embedded in an in-vehicle device. In this system, a rewriting software module for updating the software module of an ECU of a vehicle is transmitted to the in-vehicle device through wireless communication. Japanese Patent Application Publication No. 2012-043253 (JP 2012-043253 A) describes a system that causes an in-vehicle device and a mobile terminal to cooperate with each other. In such a system as well, it is assumed that a software module embedded in the in-vehicle device or a software module embedded in the mobile terminal is updated.

The technique for merely updating the in-vehicle device-side software module, as described in JP 2004-326689 A, may be applied to the system described in JP 2012-043253 A. However, for example, when it is not possible to ensure compatibility with the mobile terminal-side software module, it may be not possible to properly utilize a cooperation function between the in-vehicle device and the mobile terminal. Depending on a mobile terminal-side update status, there are a case where an in-vehicle device-side update is required and a case where an in-vehicle device-side update is not required. At the time of designing a system of this type, in order to enable the cooperation function between the in-vehicle device and the mobile terminal, for example, a technique is required to be able to timely update the in-vehicle device-side software module on the basis of the update status of the mobile terminal-side software module.

SUMMARY OF THE INVENTION

The invention provides an effective technique for timely updating software modules respectively embedded in an in-vehicle device and a mobile terminal that are connected so as to be able to cooperate with each other.

A first aspect of the invention relates to an in-vehicle device mounted on a vehicle and connected to a mobile terminal so as to be able to cooperate with the mobile terminal. The in-vehicle device includes a control unit configured to, when a first software module embedded in the mobile terminal has been updated, update a second software module embedded in the in-vehicle device on the basis of software information about the updated first software module. For cooperation between the in-vehicle device and the mobile terminal, for example, a software module embedded in one of the in-vehicle device and the mobile terminal and a software module embedded in the other one of the in-vehicle device and the mobile terminal may have compatibility with each other such that information handled by the one of the software modules is allowed to be handled by the other one of the software modules.

With the in-vehicle device according to the above aspect, a cooperation function between the in-vehicle device and the mobile terminal is enabled, for example, even when the first software module of the mobile terminal has been updated.

In the above aspect, the in-vehicle device may be connected to an information management device via a communication line. The control unit may be configured to receive the software information about the first software module embedded in the mobile terminal from the mobile terminal and transmit the software information to the information management device via the communication line, and, when an update of the first software module has been detected using the software information received from the mobile terminal, receive an update file for updating the second software module in correspondence with the software information about the updated first software module from the information management device via the communication line.

In the above aspect, the "communication line" may be a line that utilizes at least one of wireless connection and wired connection. The update file is configured as a correction file (correction program) for correcting an intended software module. In this case, the control unit may be configured as transmitting means for transmitting the software information about the first software module to the information management device, configured as update detecting means for detecting an update of the first software module and configured as receiving means for receiving the update file from the information management device. Thus, the update file corresponding to the update of the first software module of the mobile terminal is automatically transmitted from the information management device to the in-vehicle device. In the in-vehicle device, the second software module is updated using the update file. Thus, it is possible to timely update the second software module of the in-vehicle device using the update file without a burden on a user.

In the above aspect, the control unit may be configured to, when a predetermined condition is satisfied, install the update file received from the information management device. Thus, it is possible to inhibit erroneous installation of the update file.

In the above aspect, the control unit may be configured to, when the update file received from the information management device has downward compatibility, determine that the predetermined condition is satisfied. When an update file having downward compatibility has been installed, information that can be handled by the pre-updated software module can also be handled by the updated software module. In contrast to this, when an update file having no downward compatibility has been installed, information that can be handled by the pre-updated software module may not be handled by the updated software module. According to the above aspect, it is possible to inhibit erroneous installation of the update file having no downward compatibility.

In the above aspect, the control unit may be configured to, when the vehicle on which the in-vehicle device is mounted is in a stopped state, determine that the predetermined condition is satisfied. The control unit may be configured to, when the update file received from the information management device has downward compatibility and the vehicle on which the in-vehicle device is mounted is in a stopped state, determine that the predetermined condition is satisfied. With the above configuration, it is possible to inhibit influence of installation of the update file on travel of the vehicle.

A second aspect of the invention relates to an in-vehicle device mounted on a vehicle, connected to a mobile terminal so as to be able to cooperate with the mobile terminal and connected to an information management device via a communication line such that information is communicable. The in-vehicle device includes a control unit configured to, when an error has occurred in cooperation between the in-vehicle device and the mobile terminal, transmit error information about the error to the information management device via the communication line. In this case, the control unit of the in-vehicle device may be configured as transmitting means for transmitting the error information to the information management device. According to the second aspect, a user is able to timely acquire error information through the in-vehicle device.

In the above second aspect, the control unit may be configured to determine that the error has occurred when the in-vehicle device and the mobile terminal cannot be connected to each other. According to the above aspect, a user is able to recognize through the in-vehicle device that the error is due to the fact that the in-vehicle device and the mobile terminal cannot be connected to, each other.

In the above aspect, the control unit may be configured to determine that the error has occurred in cooperation between the in-vehicle device and the mobile terminal when an application software module of the mobile terminal cannot be run in a state where the in-vehicle device and the mobile terminal are connected to each other. According to the above aspect, a user is able to recognize through the in-vehicle device that the error is due to the fact that the application software module of the mobile terminal cannot be run.

In the above aspect, the error information may include version information at the time when the error has occurred in a system software module embedded in the mobile terminal in order to run the application software module. According to the above aspect, a user is able to easily determine whether the error is due to a version upgrade of the system software module.

A third aspect of the invention relates to a mobile terminal connected to an in-vehicle device mounted on a vehicle so as to be able to cooperate with the in-vehicle device and connected to an information management device via a communication line. The mobile terminal includes a control unit configured to, when an error has occurred in cooperation between the mobile terminal and the in-vehicle device, transmit error information about the error to the information management device via the communication line. In the above aspect, the control unit of the mobile terminal may be configured as error detecting means for detecting occurrence of the error and configured as transmitting means for transmitting the error information to the information management device. Thus, a user is able to timely acquire the error information through the mobile terminal.

In the above aspect, the control unit may be configured to determine that the error has occurred when the mobile terminal and the in-vehicle device cannot be connected to each other. According to the above aspect, a user is able to recognize through the mobile terminal that the error is due to the fact that the in-vehicle device, and the mobile terminal cannot be connected to each other.

In the above aspect, the control unit may be configured to determine that the error has occurred in cooperation between the mobile terminal and the in-vehicle device when an application software module of the mobile terminal cannot be run in a state where the mobile terminal and the in-vehicle device are connected to each other. According to the above aspect, a user is able to recognize through the mobile terminal that the error is due to the fact that the application software module of the mobile terminal cannot be run.

In the above aspect, the error information may include version information at the time when the error has occurred in a system software module embedded in the mobile terminal in order to run the application software module. According to the above aspect, a user is able to easily determine whether the error is due to a version upgrade of the system software module.

A fourth aspect of the invention relates to an information management device connected via a communication line to at least one of an in-vehicle device mounted on a vehicle and a mobile terminal connected to the in-vehicle device so as to be able to cooperate with the in-vehicle device. The information management device includes a control unit configured to, when a first software module embedded in the mobile terminal has been updated, update a second software module embedded in the in-vehicle device on the basis of software information about the updated first software module. According to the above aspect, when the first software module of the mobile terminal has been updated, it is possible to update the second software module of the in-vehicle device in correspondence with the update of the first software module. Therefore, for example, even when the first software module of the mobile terminal has been updated, a cooperation function between the hi-vehicle device and the mobile terminal is enabled.

In the fourth aspect, the control unit may be configured to receive the software information about the first software module embedded in the mobile terminal and, when an update of the first software module has been detected using the received software information, transmit an update file for updating the second software module to the in-vehicle device in correspondence with the software information about the updated first software module. In this case, the control unit may be configured as receiving means for receiving the software information about the first software module, configured as update detecting means for detecting an update of the first software module and configured as transmitting means for transmitting the update file to the in-vehicle device. Thus, the update file corresponding to the update of the first software module of the mobile terminal is automatically transmitted from the information management device to the in-vehicle device. In the in-vehicle device, the second software module is updated using the update file. Thus, it is possible to timely update the second software module of the in-vehicle device using the update file without a burden on a user.

In the above aspect, the control unit may be configured to receive the software information about the first software module from the in-vehicle device, the software information having been received by the in-vehicle device from the mobile terminal during connection between the in-vehicle device and the mobile terminal. According to the above aspect, the information management device is able to acquire the software information about the first software module during connection between the in-vehicle device and the mobile terminal.

In the above aspect, the control unit may be configured to store the software information about the first software module in association with the in-vehicle device, the software information having been received from the in-vehicle device during connection between the in-vehicle device and the mobile terminal. According to the above aspect, even after connection between the in-vehicle device and the mobile terminal has been released, the software information is kept in association with the in-vehicle device. Thus, even when the first software module of the mobile terminal has been updated after the release of connection, it is possible to timely update the second software module of the in-vehicle device using the stored software information.

In the above aspect, the control unit may be configured to receive the software information about the first software module from the mobile terminal on the condition that a launch of a predetermined application software module embedded in the mobile terminal has been completed. According to the above aspect, even in a state where connection between the in-vehicle device and the mobile terminal is released, it is possible to transmit the update file to the in-vehicle device in advance in preparation for the next connection between the in-vehicle device and the mobile terminal.

A fifth aspect of the invention relates to an information management device connected via a communication line to at least one of an in-vehicle device mounted on a vehicle and a mobile terminal connected to the in-vehicle device so as to be able to cooperate with the in-vehicle device. The information management device includes a control unit configured to, when an error has occurred in cooperation between the in-vehicle device and the mobile terminal, receive error information about the error. In this case, the control unit of the information management device may be configured as receiving means for receiving the error information from the in-vehicle device or the mobile terminal. According to the above aspect, the information management device is able to timely acquire the error information.

In the fifth aspect, the control unit may be configured to determine that the error has occurred when an application software module of the mobile terminal cannot be run in a state where the in-vehicle device and the mobile terminal are connected to each other. According to the above aspect, the information management device is able to recognize that the error is due to the fact that the application software module of the mobile terminal cannot be run.

In the above aspect, the error information may include version information at the time when the error has occurred in a system software module embedded in the mobile terminal in order to run the application software module. In addition, the control unit of the information management device may be configured to determine that the error is due to a version upgrade of the system software module when the version information included in the error information is newer than the version information acquired in advance for the system software module embedded in the mobile terminal. According to the above aspect, the information management device is able to accurately determine that the error is due to a version upgrade.

In the above aspect, the error information may include version information at the time when the error has occurred in a system software module embedded in the mobile terminal in order to run the application software module. In addition, the control unit may be configured to, when the number of pieces of the error information including the version information exceeds a predetermined number, determine that the error is due to a version upgrade of the system software module. When the number of pieces of error information is relatively large, it is highly likely that the error is due to a version upgrade. Thus, the information management device is able to accurately determine that the error is due to a version upgrade.

In the above aspect, the control unit may be configured to create an update file for updating the system, software module using the error information including the version information. In this case, the control unit may be configured as update file creating means for creating the update file.

According to the above aspect, it is possible to immediately create an update file after occurrence of an error has been detected.

In the above aspect, the control unit may be configured to transmit the created update file to the mobile terminal associated with the error information. In this case, the control unit may be configured as update file transmitting means for transmitting the update file to the mobile terminal. According to the above aspect, it is possible to immediately transmit the created update file to the predetermined mobile, terminal, and, after that, it is possible to quickly update the predetermined mobile terminal using the update file.

A sixth aspect of the invention relates to an information communication system including an in-vehicle device mounted on a vehicle and a mobile terminal connected to the in-vehicle device so as to be able to cooperate with the in-vehicle device. In the information communication system, when a first software module embedded in the mobile terminal has been updated, a second software module embedded in the in-vehicle device is updated on the basis of software information about the updated first software module. According to the above aspect, when the first software module of the mobile terminal has been updated, it is possible to update the second software module of the in-vehicle device in correspondence with the update of the first software module.

In the above sixth aspect, the information communication system may include an information management device configured to be connected via a communication line to at least one of the in-vehicle device and the mobile terminal. In addition, the information management device may be configured to receive the software information about the first software module embedded in the mobile terminal and, when an update of the first software module has been detected using the received software information, transmit an update file for updating the second software module to the in-vehicle device in correspondence with the software information about the updated first software module. According to the above aspect, it is possible to timely update the second software module of the in-vehicle device using the update file without a burden on a user.

In the above aspect, the in-vehicle device may be configured to receive the software information about the first software module from the mobile terminal during connection with the mobile terminal. In addition, the information management device may be configured to receive the software information about the first software module from the in-vehicle device, the software information having been received by the in-vehicle device from the mobile terminal. According to the above aspect, the information management device is able to acquire the software information about the first software module during connection between the in-vehicle device and the mobile terminal.

In the above aspect, the information management device may be configured to store the software information about the first software module in association with the in-vehicle device, the software information having been received from the in-vehicle device. According to the above aspect, even when the first software module of the in-vehicle device has been updated after the release of connection between the in-vehicle device and the mobile terminal, it is possible to timely update the second software module of the in-vehicle device using the stored software information.

In the above aspect, the information management device may be configured to receive the software information about the first software module from the mobile terminal on the condition that a launch of a predetermined application software module embedded in the mobile terminal has been completed. According to the above aspect, even in a state where connection between the in-vehicle device and the mobile terminal is released, it is possible to transmit the update file to the in-vehicle device in advance in preparation for the next connection between the in-vehicle device and the mobile terminal.

In the above aspect, the in-vehicle device may be configured to, when a predetermined condition is satisfied, install the update file received from the information management device. According to the above aspect, by setting the condition for installing the update file, it is possible to inhibit erroneous installation of the update file.

In the above aspect, the information management device may be configured to transmit the update file to the mobile terminal when information communication with the in-vehicle device is disabled. For example, when it is not possible to establish communication between the information management device and the in-vehicle device although there is a communication line therebetween or when there is no communication line between the information management device and the in-vehicle device, information communication between the information management device and the in-vehicle device is disabled. In addition, the mobile terminal may be configured to, when connected to the in-vehicle device, transmit the update file to the in-vehicle device, the update file having been received from the information management device. Thus, it is possible to cope with the case where the update file cannot be directly transmitted from the information management device to the in-vehicle device. In addition, the in-vehicle device may be configured to, when a predetermined condition is satisfied, install the update file received from the mobile terminal. According to the above aspect, by setting the condition for installing the update file, it is possible to inhibit erroneous installation of the update file.

In the above aspect, the in-vehicle device may be configured to, when the update file has downward compatibility, determine that the predetermined condition is satisfied. According to the above aspect, it is possible to inhibit erroneous installation of the update file having no downward compatibility.

In the above aspect, the in-vehicle device may be configured to, when the update file has downward compatibility and the vehicle on which the in-vehicle device is mounted is in a stopped state, determine that the predetermined condition is satisfied. Thus, it is possible to inhibit erroneous installation of an update file having no downward compatibility or influence of installation of an update file on travel of the vehicle while the vehicle is travelling.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an information communication system according to the invention will be described with reference to the accompanying drawings. The information communication system is a system for carrying out information communication between an in-vehicle device mounted on a vehicle and a mobile terminal that a user is allowed to carry.

Figure 1:
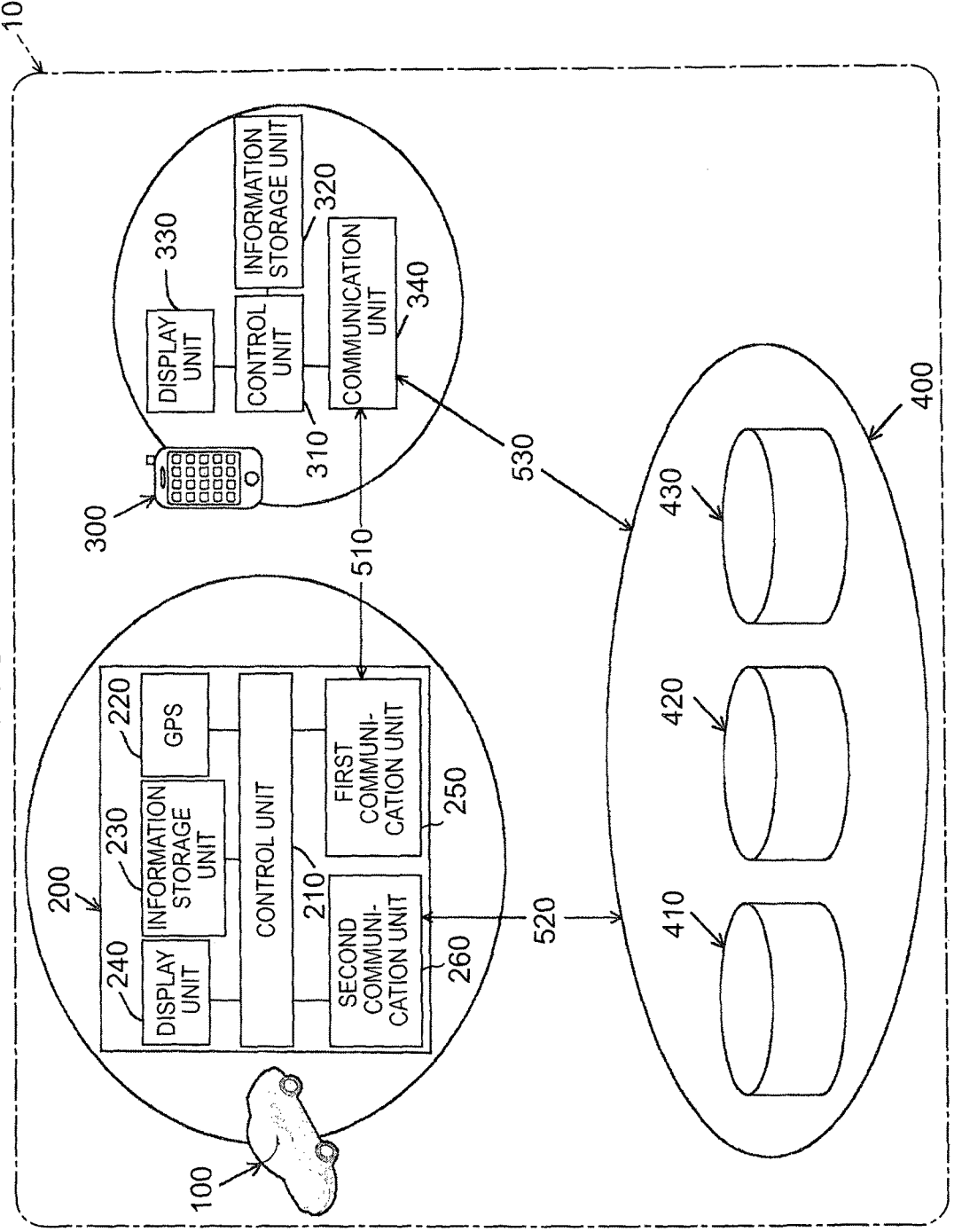
FIG. 1 is a schematize view of an information communication system according to an embodiment of the invention.

An information communication system 10 shown in FIG. 1 includes an in-vehicle device 200, a mobile terminal 300, an information management device 400, and communication lines 510, 520, 530 as component elements. The in-vehicle device 200 is mounted on a vehicle 100. In the information communication system 10, a further component element may be added to the above-described component elements as needed. The vehicle 100 that includes the in-vehicle device 200 may be configured as one component element of the information communication system 10. The information communication system 10 functions as an "information communication system" of the invention.

The in-vehicle device 200 includes a control unit 210, a GPS unit (simply referred to as "GPS" where appropriate) 220, an information storage unit 230, a display unit 240, a first communication unit 250 and a second communication unit 260 as component elements. In the in-vehicle device 200, a further component element may be added to the above-described component elements as needed.

The in-vehicle device 200 typically has a navigation function that carries out vehicle route guidance (also referred to as "route guidance"). That is, at least a navigation application software module that provides the navigation function is embedded in the in-vehicle device 200. In this case, the in-vehicle device 200 is configured as a navigation system exclusive to the vehicle 100 that is a host vehicle or configured as a navigation system shared among a plurality of vehicles including the vehicle 100. On the other hand, the in-vehicle device 200 may be formed of a mobile terminal into which a navigation application software module is incorporated. The mobile terminal is, for example, a cellular phone (including a smart phone), a tablet information terminal, a laptop personal computer, or the like. The in-vehicle device 200 functions as an "in-vehicle device" of the invention.

The control unit 210 is independently connected to each of the GPS unit 220, the information storage unit 230, the display unit 240, the first communication unit 250 and the second communication unit 260, and has the function of controlling each connected element. The control unit 210 includes a central processing unit (CPU) as an arithmetic processing unit.

The GPS unit 220 has the function of detecting positional information of the vehicle 100 (also positional information of a vehicle user who is seated in the vehicle 100) on the basis of radio waves from GPS satellites. The positional information detected by the GPS unit 220 is stored in the information storage unit 230 via the control unit 210 or, where necessary, displayed on the display unit 240.

The information storage unit 230 has the function of storing the positional information detected by the GPS unit 220, information transmitted from the external mobile terminal 300 or the information management device 400, furthermore, information about a software module embedded (hereinafter, also referred to as "installed") in the in-vehicle device 200, and the like. The "software module" includes a system software module (hereinafter, also referred to as operating system (OS)) required during operation of the in-vehicle device 200 or the mobile terminal 300 and an application software module (hereinafter, also simply referred to as "application") for carrying out a job that the user desires to run in the in-vehicle device or the mobile terminal. The information stored in the information storage unit 230 is loaded by the control unit 210 as needed. For example, the control unit 210 is able to launch and run an application software module embedded in the information storage unit 230 by loading the application at appropriate timing. The operating system is so-called "system software", and is a software module that provides an interface abstracted from hardware to an application software module.

The display unit 240 (also referred to as "display") has the function of displaying output information from the control unit 210. For example, the output information (output screen) of an application that is executed by the control unit 210 is displayed on the display unit 240.

The first communication unit 250 has the function of carrying out information communication with a communication unit 340 (described later) of the mobile terminal 300 via the communication line 510. In this case, the communication line 510 connects the first communication unit 250 of the in-vehicle device 200 with the communication unit 340 of the mobile terminal 300 such that information is communicable. Wireless communication or wired communication (such as communication through cable connection) is usable for the communication line 510. When the user who is seated in the vehicle 100 carries the mobile terminal 300, it is desirable to use near field communication (for example, Bluetooth (registered trademark)).

The second communication unit 260 has the function of carrying out information communication via the communication line 520 with the information management device 400 provided outside of the vehicle 100. In this case, it is desirable to use wireless communication as the communication line 520.

The mobile terminal 300 is an external communication device provided outside of the in-vehicle device 200. Here, the "mobile terminal" is a device that is usable by the user while being carried by the user, and is typically a portable cellular phone (including a smart phone), a tablet information terminal, a laptop personal computer, or the like. The mobile terminal 300 includes a control unit 310, an information storage unit 320, a display unit 330 and the communication unit 340. In the mobile terminal 300, a further component element may be added to the above-described component elements as needed. The mobile terminal 300 functions as a "mobile terminal" of the invention.

The mobile terminal 300 is connected to the in-vehicle device 200 via the communication line 510 so as to be able to cooperate with the in-vehicle device 200. In this case, cooperation between the in-vehicle device 200 and the mobile terminal 300 is typically a mode in which software modules are compatible with each other such that information handled by the software module embedded in one of the in-vehicle device 200 and the mobile terminal 300 can also be handled by the software module embedded in the other one.

The control unit 310 is independently connected to each of the information storage unit 320, the display unit 330 and the communication unit 340, and has the function of controlling each connected element. The control unit 310, as well as the control unit 210, includes a central processing unit (CPU) that serves as an arithmetic processing unit.

The information storage unit 320 has the function of storing information transmitted from the external in-vehicle device 200 or the information management device 400, information directly input from an information input unit (not shown) by the user, furthermore, information about a system software module or application software module embedded in the mobile terminal 300, and the like. The information stored in the information storage unit 320 is loaded by the control unit 310 as needed. For example, the control unit 310 is able to launch and run an application embedded in the information storage unit 320 by loading the application at appropriate timing.

The display unit 330 (also referred to as "display") has the function of displaying output information from the control unit 310. For example, the output information (output screen) of the application that is run by the control unit 310 is displayed on the display unit 330.

The communication unit 340 has the function of carrying out information communication with the first communication unit 250 of the in-vehicle device 200 via the communication line 510 and carrying out information communication with the information management device 400 via the communication line 530. In the communication unit 340, a first portion that is responsible for information communication with the first communication unit 250 and a second portion that is responsible for information communication with the information management device 400 may be independent of each other. In this case, it is desirable to use wireless communication as the communication line 530.

The information management device 400 is a device provided outside of the in-vehicle device 200 and the mobile terminal 300. The information management device 400 is desirably able to carry out information communication with each of a plurality of the in-vehicle devices 200 and is desirably able to carry out information communication with each of a plurality of the mobile terminals 300. Thus, the information management device 400 may be regarded as an information management center. The information management device 400 includes an OS information server 410, an update file server 420 and an error information server 430. In the information management device 400, another server may be added to the above-described servers as needed. The information management device 400 functions as an "information management device" of the invention.

The OS information server 410 includes an area that stores (also referred to as "accumulates" or "saves") information about each OS embedded in a corresponding one of the in-vehicle device 200 and the mobile terminal 300 (hereinafter, also referred to as "OS information"). The OS information includes information about the type of OS, information about the version of the OS, and the like.

The update file server 420 includes an area that stores an update file for updating the OS of the mobile terminal 300 and an update file for updating the OS of the in-vehicle device 200 in correspondence with an update of the mobile terminal 300. Here, the "update file" is configured as a correction file (correction program) for correcting an intended software module.

The error information server 430 includes an area that stores error information about an error that has occurred in cooperation between the in-vehicle device 200 and the mobile terminal 300.

Here, description will be made on the case where a first updating process (hereinafter, also referred to as "update") of the in-vehicle device 200 is executed by the information communication system 10. In this case, the control unit 210 of the in-vehicle device 200 serves as a control subject, and is able to execute the first updating process.

In the first updating process, when a first software module embedded in the mobile terminal 300 has been updated, the control unit 210 updates a second software module embedded in the in-vehicle device 200 on the basis of software information about the updated first software module. Here, the "software information" includes information about the type of software module, information about the version of the software module, and the like. Thus, when the first software module of the mobile terminal 300 has been updated, it is possible to update the second software module of the in-vehicle device 200 in correspondence with the update of the first software module. Therefore, for example, even when the first software module of the mobile terminal 300 has been updated, the cooperation function between the in-vehicle device 200 and the mobile terminal 300 is enabled. In addition, by verifying compatibility in the in-vehicle device 200, it is possible to shorten a period of time required for the verification.

Here, desirably, the control unit 210 receives software information about the first software module embedded in the mobile terminal 300 from the mobile terminal 300 and then transmits the software information to the information management device 400 via the communication line 520. When the control unit 210 has detected an update of the first software module using the software information received from the mobile terminal 300, the control unit 210 receives an update file for updating the second software module in correspondence with the software information about the updated first software module from the information management device 400 via the communication line 520. The update file is configured as a correction file (correction program) for correcting an intended software module. Thus, the update file corresponding to the update of the first software module of the mobile terminal 300 is automatically transmitted from the information management device 400 to the in-vehicle device 200. In the in-vehicle device 200, the second software module is updated using the update file. Thus, it is possible to timely update the second software module of the in-vehicle device 200 using the update file without a burden on the user. The process may be executed by a control unit of the information management device 400 instead of the control unit 210.

After that, the control unit 210 installs the update file received from the information management device 400 when a predetermined condition is satisfied. Thus, by setting the condition for installing the update file, it is possible to inhibit erroneous installation of the update file.

In this case, the control unit 210 desirably determines that the predetermined condition is satisfied when the update file received from the information management device 400 has downward compatibility. When an update file having downward compatibility has been installed, information that can be handled by the pre-updated software module may also be handled by the updated software module. In contrast to this, when an update file having no downward compatibility has been installed, information that can be handled by the pre-updated software module may not be able to be handled by the updated software module. Thus, it is possible to inhibit erroneous installation of an update file having no downward compatibility.

Alternatively, the control unit 210 desirably determines that the predetermined condition is satisfied when the update file received from the information management device 400 has downward compatibility and the vehicle 100 on which the in-vehicle device 200 is mounted is in a stopped state. Here, for the "stopped state" of the vehicle, it may be determined that the vehicle 100 is in a stopped state typically, for example, when an ignition device of the vehicle 100 is in an off state, when a parking brake of the vehicle 100 is in an on state (the parking brake is in an enabled state) or when a battery of the vehicle 100 that serves as an electric vehicle is being charged. Thus, it is possible to inhibit erroneous installation of an update file having no downward compatibility or influence of installation of an update file on travel of the vehicle 100.

Figure 2:
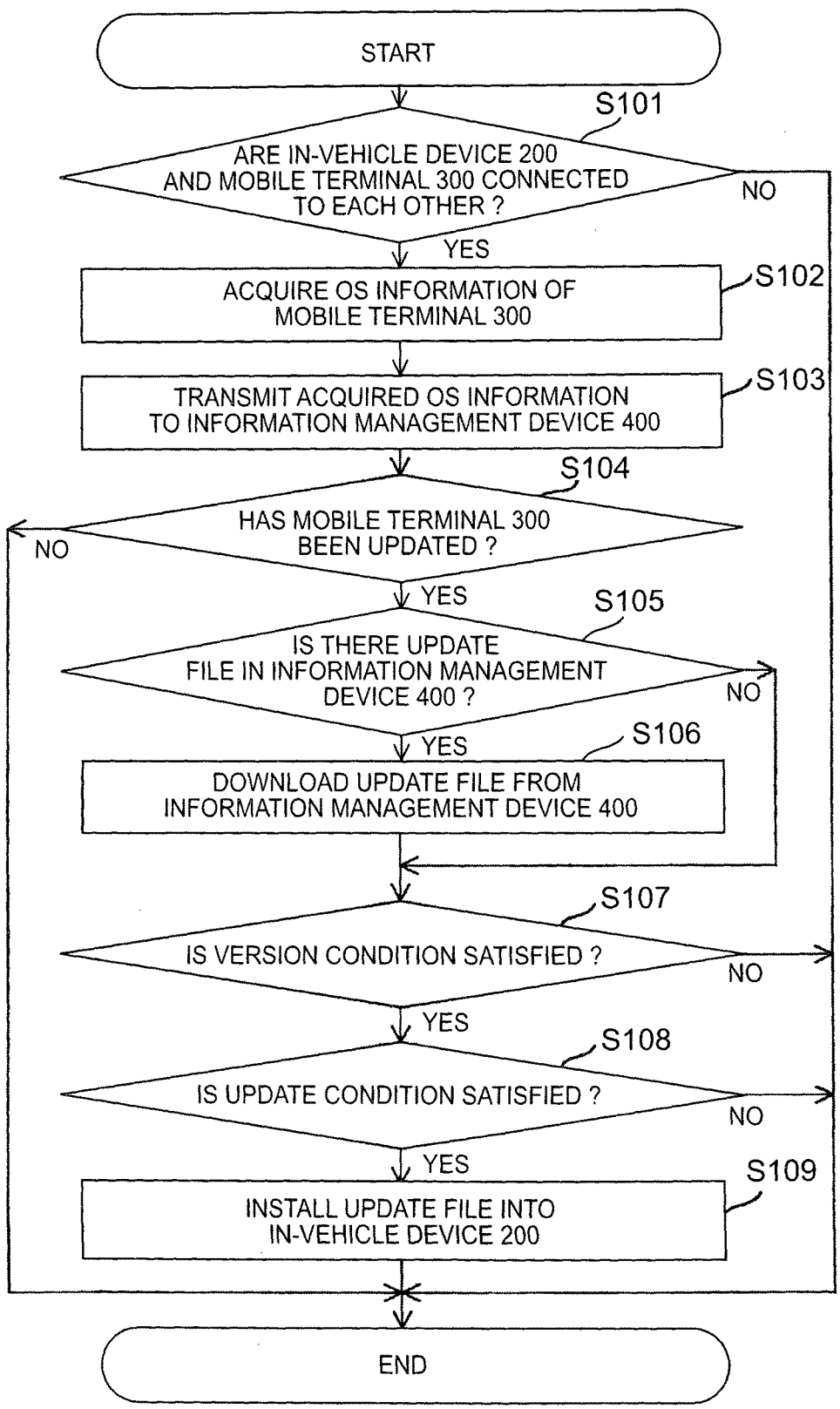
FIG. 2 is a flowchart for executing a first updating process of a system software module of an in-vehicle device by the information communication system.

FIG. 2 is referred to for specific steps of the above-described first updating process. As shown in the flowchart of FIG. 2, the process includes processes of step S101 to step S109. In this case, the in-vehicle device 200 serves as a control subject, and is able to execute the processes of the steps. On the other hand, at least one element appropriately selected from among the in-vehicle device 200, the mobile terminal 300 and the information management device 400 may be allocated to each step as a control subject.

In the process of step S101, the control unit 210 determines whether the in-vehicle device 200 is connected to the mobile terminal 300 via the first communication unit 250, the communication line 510 and the communication unit 340. In this case, it is desirable that a connected state established between the in-vehicle device 200 and the mobile terminal 300 by automatically detecting proximity of the mobile terminal 300 to the in-vehicle device 200 and then establishing pairing between the in-vehicle device 200 and the mobile terminal 300. As another mode, the connected state may be established through user's input operation of an information input unit (not shown). Here, when the condition of step S101 is satisfied (Yes in step S101), that is, when the in-vehicle device 200 and the mobile terminal 300 are connected to each other, the process proceeds to step S102. On the other hand, when the condition of step S101 is not satisfied, that is, when the in-vehicle device 200 and the mobile terminal 300 are not connected to each other (No in step S101), the processes of step S102 to step S109 are skipped, and the updating process is ended.

In the process of step S102, the control unit 210 acquires the OS information about the OS embedded in the mobile terminal 300, that is, information by which it is possible to identify the type and version of the OS. For example, the OS information stored in the information storage unit 320 of the mobile terminal 300 is loaded by the control unit 310, and then the OS information is received by the first communication unit 250 via the communication unit 340 and the communication line 510. Thus, the current type and version of the OS of the mobile terminal 300 are identified. In this case, the OS embedded in the mobile terminal 300 functions as a "first software module" of the invention.

In the process of step S103, the control unit 210 transmits the OS information of the mobile terminal 300, acquired in the process of step S102, to the information management device 400 via the second communication unit 260 and the communication line 520. At this time, the OS information of the mobile terminal 300 may be transmitted to the information management device 400 and stored in the information storage unit 230. In the information management device 400, the OS information of the mobile terminal 300 is saved in the OS information server 410. The OS information of the mobile terminal 300 just needs to be finally transmitted to the information management device 400. Thus, the OS information may be directly transmitted from the mobile terminal 300 to the information management device 400 via the communication line 530. In this case, desirably, the information management device 400 serves as a control subject, and executes the processes of step S102 and step S103.

In the process of step S104, the control unit 210 determines whether the mobile terminal 300 has been updated (actually, whether the OS embedded in the mobile terminal 300 has been updated) on the basis of the OS information of the mobile terminal 300, received from the mobile terminal 300. When the condition of step S104 is satisfied (Yes in step S104), that is, when the mobile terminal 300 has been updated, the process proceeds to step S105. On the other hand, when the condition of step S104 is not satisfied (No in step S104), that is, when the mobile terminal 300 has not been updated, the updating process is directly ended.

In the process of step S105, the control unit 210 determines whether an update file for the OS of the in-vehicle device 200 in correspondence with the update of the mobile terminal 300 is saved in the update file server 420, of the information management device 400. The update file is used when the OS that has been already embedded in the in-vehicle device 200 is updated (hereinafter, also simply referred to as "the in-vehicle device 200 is updated"). When the condition of step S105 is satisfied (Yes in step S105), that is, when there is an update file, the process proceeds to step S106. On the other hand, when the condition of step S105 is not satisfied (No in step S105), that is, when there is no update file, step S106 is skipped, and the process proceeds to step S107.

In the process of step S106, the control unit 210 receives and downloads the update file saved in the update file server 420 of the information management device 400. The update file saved in the update file server 420 just needs to be finally downloaded to the in-vehicle device 200. Thus, the update file may be downloaded to the in-vehicle device 200 via the mobile terminal 300.

In the process of step S107, the control unit 210 determines whether a predetermined version condition is satisfied. For example, when the update file has not been installed in the in-vehicle device 200 yet and the version of the OS of the mobile terminal 300 has been updated to the version corresponding to the update file, it is determined that the predetermined version condition is satisfied. In this case, the control unit 210 may acquire the version of the OS of the mobile terminal 300 at the timing of step S107 or may acquire the version of the OS of the mobile terminal 300 in step S102. When the condition of step S107 is satisfied (Yes in step S107), that is, when the above-described version condition is satisfied, the process proceeds to step S108. On the other hand, when the condition of step S107 is not satisfied (No in step S107), that is, when the above-described version condition is not satisfied, step S108 and step S109 are skipped, and the updating process is directly ended.

For the version condition, when the version of the OS of the mobile terminal 300 is a version corresponding to the update file, compatibility between the in-vehicle device 200 and the mobile terminal 300 is ensured when the update file has been installed in the in-vehicle device 200. Thus, when the version condition is satisfied, there is no trouble even when the update file is installed in the in-vehicle device 200. In contrast to this, when the version of the OS of the mobile terminal 300 is not a version corresponding to the update file, compatibility is not ensured between the in-vehicle device 200 and the mobile terminal 300 when the update file is installed in the in-vehicle device 200. Thus, when the version condition is not satisfied, it is desirable that the update file be not installed in the in-vehicle device 200.

In the process of step S108, the control unit 210 determines whether an update condition for updating the in-vehicle device 200 is satisfied. Typically, when the update file has been downloaded to the in-vehicle device 200 and the vehicle 100 is in a stopped state, it is determined that the update condition is satisfied. When the condition of step S108 is satisfied (Yes in step S108), that is, when the above-described update condition is satisfied, the process proceeds to step S109. On the other hand, when the condition of step S108 is not satisfied (No in step S108), that is, when the above-described update condition is not satisfied, step S109 is skipped, and the updating process is ended.

In the process of step S109, the control unit 210 installs the update file that has been already downloaded from the information management device 400 to the in-vehicle device 200. It is possible to update the OS embedded in the in-vehicle device 200 through installation of the update file. As an alternative embodiment, the process of step S109 may be executed while at least one of the process of determining whether the version condition is satisfied in step S107 and the process of determining whether the update condition is satisfied in step S108 is omitted. When both step S107 and step S108 are omitted, the update file downloaded from the information management device 400 to the in-vehicle device 200 is immediately installed in the in-vehicle device 200.

With the above-described first updating process, it is possible to automatically transmit the update file of the in-vehicle device 200, corresponding to the OS information of the mobile terminal 300, to the in-vehicle device 200. Thus, it is possible to timely update the OS of the in-vehicle device 200 without a burden on the user. By determining whether to install the update file in the in-vehicle device 200 on the basis of the version of the OS of the mobile terminal 300, it is possible to inhibit erroneous installation of the update file. In addition, by taking into consideration that the vehicle 100 is in a stopped state at the time of determining whether the update condition is satisfied, it is possible to inhibit influence of the process of updating the OS of the in-vehicle device 200 on the travel state of the vehicle 100.

Next, description will be made on the case where a second updating process of the in-vehicle device 200 is executed by the above-described information communication system 10. In this case, the information management device 400 (actually, a server (control unit) that constitutes the information management device 400) serves as a control subject, and is able to, execute the second updating process.

In the second updating process, the information management device 400 desirably receives the software information about the first software module of the mobile terminal 300 from the in-vehicle device 200. The software information has been received by the in-vehicle device 200 from the mobile terminal 300 during connection between the in-vehicle device 200 and the mobile terminal 300. At this time, the in-vehicle device 200, during connection with the mobile terminal 300, receives the software information about the first software module from the mobile terminal 300. Thus, the information management device 400 is able to acquire the software information about the first software module during connection between the in-vehicle device 200 and the mobile terminal 300.

The information management device 400 desirably stores the software information about the first software module in the OS information server 410 in association with the in-vehicle device 200. The software information has been received from the in-vehicle device 200 during connection between the in-vehicle device 200 and the mobile terminal 300. Thus, even after connection between the in-vehicle device 200 and the mobile terminal 300 has been released, the software information is kept in association with the in-vehicle device 200. Thus, even when the first software module of the mobile terminal 300 has been updated after the release of connection, it is possible to timely update the second software module of the in-vehicle device 200 using the stored software information.

As an alternative embodiment, the information management device 400 is able to receive the software information about the first software module from the mobile terminal 300 on the condition that a launch of a predetermined application embedded in the mobile terminal 300 has been completed. Thus, even in a state where connection between the in-vehicle device 200 and the mobile terminal 300 is released, it is possible to transmit the update file to the in-vehicle device 200 in advance in preparation for the next connection between the in-vehicle device 200 and the mobile terminal 300.

As another alternative embodiment, the information management device 400 transmits the update file to the mobile terminal 300 when information communication with the in-vehicle device 200 is disabled. For example, when it is not possible to establish communication via the communication line 520 between the information management device 400 and the in-vehicle device 200 or when the communication line 520 is omitted, information communication between the information management device 400 and the in-vehicle device 200 is disabled. In this case, the mobile terminal 300, when connected to the in-vehicle device 200, transmits the update file to the in-vehicle device 200. The update file has been received from the information management device 400. Thus, it is possible to cope with the case where the update file cannot be directly transmitted from the information management device 400 to the in-vehicle device 200. In addition, the in-vehicle device 200 installs the update file received from the mobile terminal 300 when the predetermined condition is satisfied. Thus, by setting the condition for installing the update file, it is possible to inhibit erroneous installation of the update file.

Figure 3:
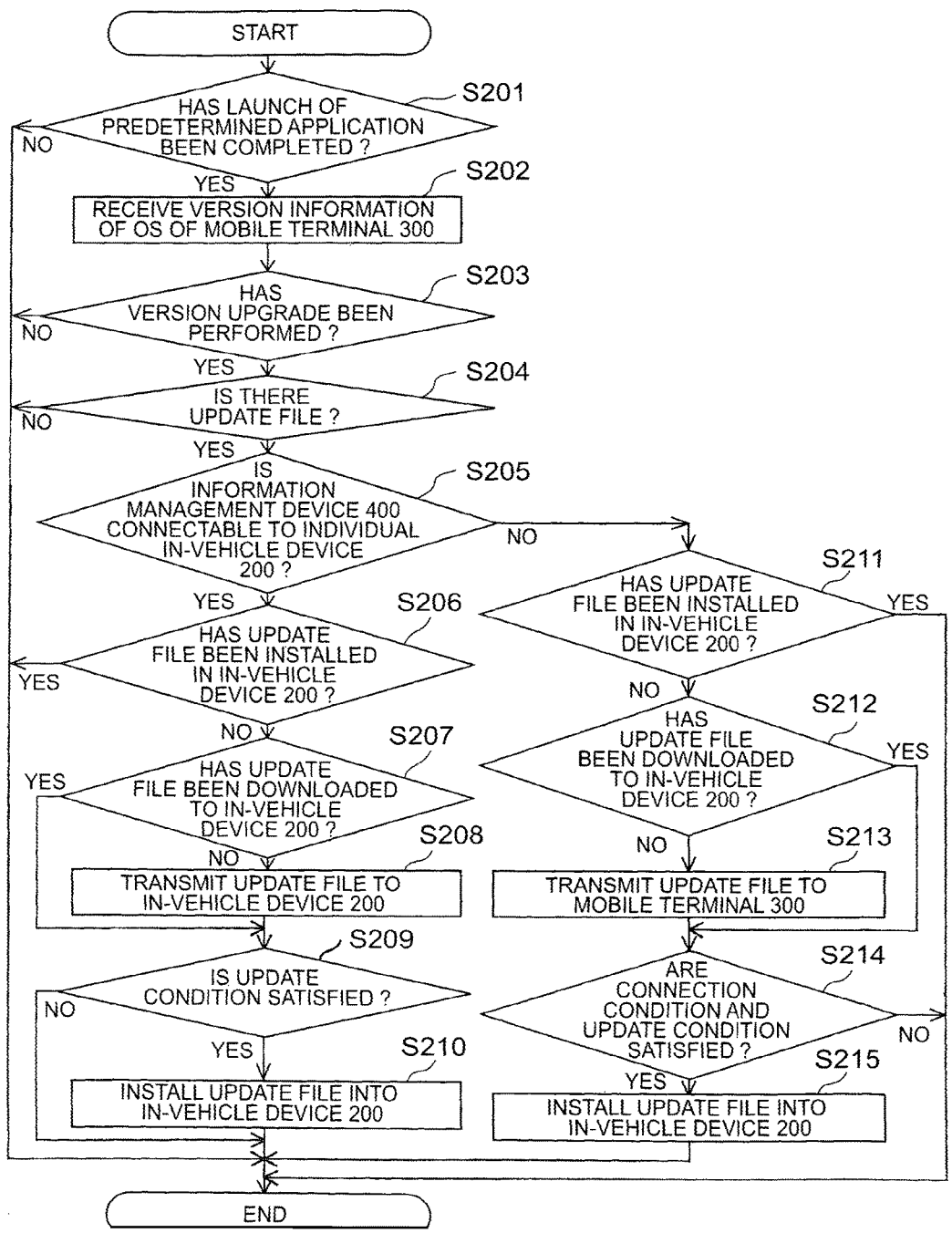
FIG. 3 is a flowchart for executing a second updating process of the system software module of the in-vehicle device by the information communication system.

FIG. 3 is referred to for specific steps of the above-described second updating process. As shown in the flowchart of FIG. 3, the process includes processes of step S201 to step S215. In this case, the information management device 400 serves as a control subject, and is able to execute the processes of the steps. On the other hand, at least one element appropriately selected from among the in-vehicle device 200, the mobile terminal 300 and the information management device 400 may be allocated to each step as a control subject.

In the process of step S201, it is detected whether a launch of a predetermined application has been completed in the mobile terminal 300. When a launch of the predetermined application has been completed (Yes in step S201), the process proceeds to step S202. On the other hand, when a launch of the predetermined application has not been completed (No in step S201), the updating process is ended.

In the process of step S202, the OS information server 410 receives the version information of the OS of the mobile terminal 300, stored in the information storage unit 320, from the communication unit 340 of the mobile terminal 300 via the communication line 530.

In the process of step S203, it is determined whether a version upgrade has been performed on the basis of the version information of the OS of the mobile terminal 300. When a version upgrade has been performed (Yes in step S203), the process proceeds to step S204. On the other hand, when a version upgrade has not been performed (No in step S203), the updating process is ended.

In the process of step S204, it is determined whether a predetermined update file corresponding to the version of the OS of the mobile terminal 300 is saved in the update file server 420. When the predetermined' update file is saved in the update file server 420 (Yes in step S204), the process proceeds to step S205. On the other hand, when the predetermined update file is not saved in the update file server 420 (No in step S204), the updating process is ended.

In the process of step S205, it is determined whether the information management device 400 is connectable to the individual in-vehicle device 200 via the communication line 520. When the information management device 400 is connectable to the individual in-vehicle device 200 (Yes in step S205), the process proceeds to step S206. In this case, it is possible to directly install the predetermined update file, associated with the process of step S204, into the in-vehicle, device 200, it is desirable that, in the process from step S206, the update file be directly provided to the in-vehicle device 200. On the other hand, when the information management device 400 is not connectable to the individual in-vehicle device 200 (No in step S205), the process proceeds to step S211. In this case, it is not possible to directly install the predetermined update file, associated with the process of step S204, into the in-vehicle device 200, so it is desirable that, in the process from step S211, the update file be indirectly installed into the in-vehicle device 200 via the mobile terminal 300.

In the process of step S206, it is determined whether the predetermined update file has been installed in the in-vehicle device 200. When the predetermined update file has not been installed in the in-vehicle device 200 (No in step S206), the process proceeds to step S207. On the other hand, when the predetermined update file has been already installed in the in-vehicle device 200 (Yes in step S206), the updating process is ended.

In the process of step S207, it is determined whether the predetermined update file has been downloaded to the in-vehicle device 200. When the predetermined update file has not been downloaded to the in-vehicle device 200 (No in step S207), the process proceeds to step S208. On the other hand, when the predetermined update file has been already downloaded to the in-vehicle device 200 (Yes in step S207), step S208 is skipped, and the process proceeds to step S209.

In the process of step S208, the predetermined update file saved in the update file server 420 is transmitted from the information management device 400 to the in-vehicle device 200 via the communication line 520. Thus, the predetermined update file is downloaded to the in-vehicle device 200. That is, the predetermined update file is saved in the information storage unit 230 of the in-vehicle device 200.

In the process of step S209, it is determined whether an update condition similar to that in the case of the above-described process of step S108 is satisfied. When the update condition is satisfied (Yes in step S209), the process proceeds to step S210. On the other hand, when the update condition is not satisfied (No in step S209), step S210 is skipped, and the updating process is ended. Step S209 may be omitted where appropriate. In this case, the update file transmitted to the in-vehicle device 200 is immediately installed without determining in step S209 whether the update condition is satisfied.

In the process of step S210, the predetermined update file saved in the information storage unit 230 is installed into the in-vehicle device 200. Thus, it is possible to update a driver and a software module that have been already installed in the in-vehicle device 200.

In the process of step S211, as in the case of step S206, it is determined whether the predetermined update file has been installed in the in-vehicle device 200. When the predetermined update file has not been installed in the in-vehicle device 200 (No in step S211), the process proceeds to step S212. On the other hand, when the predetermined update file has been already installed in the in-vehicle device 200, (Yes in step S211), the updating process is ended.

In the process of step S212, as in the case of step S207, it is determined whether the predetermined update file has been downloaded to the in-vehicle device 200. When the predetermined update file has not been downloaded to the in-vehicle device 200 (No in step S212), the process proceeds to step S213. On the other hand, when the predetermined update file has been already downloaded to the in-vehicle device 200 (Yes in step S212), step S213 is skipped, and the process proceeds to step S214.

In the process of step S213, the predetermined update file saved in the update file server 420 is transmitted from the information management device 400 to the mobile terminal 300 via the communication line 530. Thus, the predetermined update file is downloaded to the mobile terminal 300. That is, the predetermined, update file is saved in the information storage unit 320 of the mobile terminal 300.

In the process of step S214, a state where the in-vehicle device 200 and the mobile terminal 300 are connected to each other is established (connection condition is satisfied), and it is determined whether an update condition similar to that in the case of the above-described process of step S108 is satisfied. That is, when the update file has been downloaded from the mobile terminal 300 to the in-vehicle device 200 in a state where the mobile terminal 300 and the in-vehicle device 200 are connected to each other and then the vehicle 100 is in a stopped state, it is determined that the update condition is satisfied. At this time, the information management device 400 desirably receives information for determining whether the vehicle 100 is in a stopped state from the in-vehicle device 200. When the condition of step S214 is satisfied (Yes in step S214), the process proceeds to step S215. On the other hand, when the condition of step S214 is not satisfied (No in step S214), the updating process is ended. As an alternative embodiment, the process of determining whether the update condition is satisfied may be omitted from step S214. In this case, the update file transmitted to the in-vehicle device 200 is immediately installed on the condition that the in-vehicle device 200 and the mobile terminal 300 are connected to each other.

In the process of step S215, the predetermined update file saved in the information storage unit 320 is installed into the in-vehicle device 200 via the communication unit 340, the communication line 510 and the first communication unit 250. Thus, it is possible to update a driver and a software module that have been already installed in the in-vehicle device 200.

With the above-described second updating process, it is possible to acquire the version information of the OS of the mobile terminal 300 at the information management device 400 side as a result of a launch of the predetermined application. Therefore, even when connection between the in-vehicle device 200 and the mobile terminal 300 is released, it is possible to transmit the predetermined update compatible with the version of the OS of the mobile terminal 300 to the in-vehicle device 200 before the in-vehicle device 200 and the mobile terminal 300 are connected to each other. Even when connection between the in-vehicle device 200 and the mobile terminal 300 is not enabled or when there is no means associated with the connection, it is possible to indirectly transmit the predetermined update file to the in-vehicle device 200 via the mobile terminal 300.

Next, description will be made on an error information transmission process for transmitting error information about an error that occurs during connection between the in-vehicle device 200 and the mobile terminal. 300 by the information communication system 10. In this case, the control unit 210 of the in-vehicle device 200 or the control unit 310 of the mobile terminal 300 serves as a control subject; and is able to execute the error information transmission process.

In the error information transmission process, when an error has occurred in cooperation between the in-vehicle device 200 and the mobile terminal 300, error information about the error is transmitted to the information management device 400 via the communication line 520 or the communication line 530. Thus, the user is able to timely acquire the error information through the in-vehicle device 200 or the mobile terminal 300.

Here, when the application software module of the mobile terminal 300 cannot be run in a state where the in-vehicle device 200 and the mobile terminal 300 are connected to each other, it is desirable to determine that an error has occurred in cooperation between the in-vehicle device 200 and the mobile terminal 300. Thus, the user is able to recognize through the in-vehicle device 200 or the mobile terminal 300 that the error is due to the fact that the application software module of the mobile terminal 300 cannot be run.

As an alternative embodiment, when the application software module of the mobile terminal 300 cannot be run in a state where the in-vehicle device 200 and the mobile terminal 300 are connected to each other, it is determined that an error has occurred in cooperation between the in-vehicle device 200 and the mobile terminal 300. Thus, the user is able to recognize through the in-vehicle device 200 or the mobile terminal 300 that the error is due to the fact that the application software module of the mobile terminal 300 cannot be run.

In this case, error information desirably includes version information at the time when the error has occurred in the system software module embedded in the mobile terminal 300 in order to run the application software module. Thus, the user is able to easily determine whether the error is due to a version upgrade of the system software module.

Figure 4:
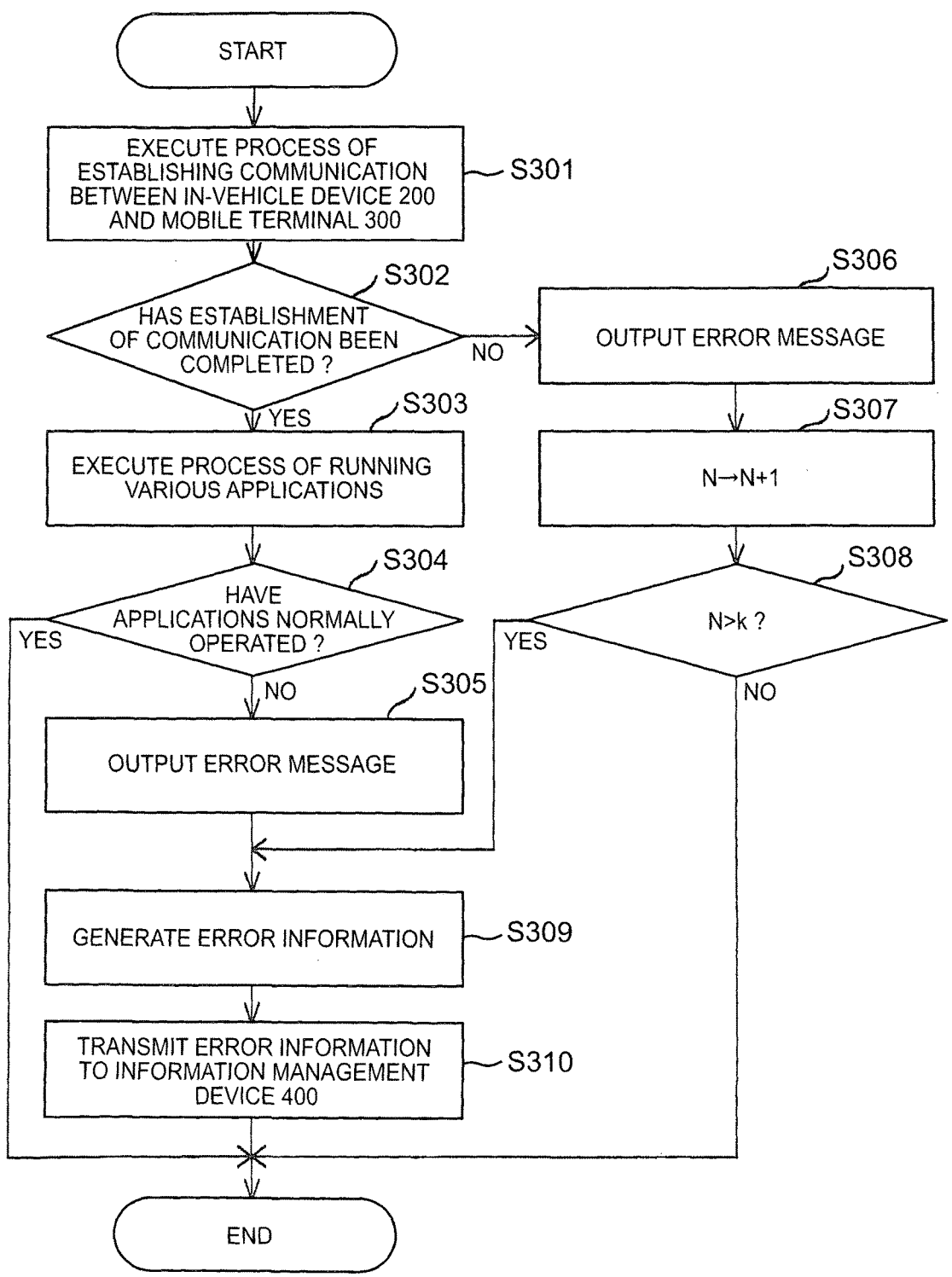
FIG. 4 is a flowchart for executing an error information transmission process by the information communication system.

FIG. 4 is referred to for specific steps of the above-described error information transmission process. As shown in the flowchart of FIG. 4, the process includes processes of step S301 to step S310. In this case, the mobile terminal 300 serves as a control subject, and is able to execute the processes of the steps. On the other hand, at least one element appropriately selected from among the in-vehicle device 200, the mobile terminal 300 and the information management device 400 may be allocated to each step as a control subject.

In step S301, the process is executed to establish communication between the in-vehicle device 200 and the mobile terminal 300. That is, the process is executed to connect the first communication unit 250 of the in-vehicle device 200 with the communication unit 340 of the mobile terminal 300 such that information is communicable.

In the process of step S302, it is determined in the process of step S301 whether establishment of communication between the in-vehicle device 200 and the mobile terminal 300 has been actually completed. When the condition of step S302 is satisfied (Yes in step S302), the process proceeds to step S303. On the other hand, when the condition of step S302 is not satisfied (No in step S302), the process proceeds to step S306.

In the process of step S303, the process is executed to run various applications through user's input operation of the information input unit (not shown) in the in-vehicle device 200 or the mobile terminal 300.

In the process of step S304, it is determined in the process of step S303 whether the applications intended to be run have normally operated. When the applications have not normally operated (No in step S304), the process proceeds to step S305. On the other hand, when the applications have normally operated (Yes in step S304), the information acquisition process is ended.

In the process of step S305, an error that the applications have not normally operated has been detected, and an error message for notifying the error is output. The error message is, for example, displayed on the display unit 240 of the in-vehicle device 200 or the display unit 330 of the mobile terminal 300. After that, the process proceeds to the process of step S309.

In the process of step S306, an error that establishment of communication between the in-vehicle device 200 and the mobile terminal 300 has not been completed has been detected, and an error message for notifying the error is output. The error message is, for example, displayed on the display unit 240 of the in-vehicle device 200 or the display unit 330 of the mobile terminal 300.

In the process of step S307, an accumulated number that "1" is added to the number of times (N) the error message is output in the process of step S306 is output. Thus, for example, "2" that is an accumulated number is output at the time when the first error message has been detected, and "3" that is an accumulated number is output at the time when the second error message has been detected.

In the process of step S308, the process proceeds to step S309 on the condition that the accumulated number output in step S307 exceeds a predetermined number k (for example, "3"). The predetermined number k may be changed as needed. On the other hand, when the condition of step S308 is not satisfied (No in step S308), the information acquisition process is ended.

In the process of step S309, in the in-vehicle device 200 or the mobile terminal 300, error information about the error detected in the process of step S305 and error information about the error detected in the process of step S306 are generated. In this case, the error information includes an error type by which it is possible to identify an error and the OS information (OS and the version of the OS) of the mobile terminal 300, associated with the error.

In the process of step S310, the error information generated in step S309 is transmitted from the in-vehicle device 200 or the mobile terminal 300 to the error information server 430 of the information management device 400. Thus, it is possible to timely acquire the error information at the information management device 400 side. Particularly, by transmitting the OS information (the version of OS) of the mobile terminal 300 to the information management device 400 together with the error information, it is possible to quickly detect an error due to a version upgrade.

With the above-described error information transmission process, an error in cooperation between the in-vehicle device 200 and the mobile terminal 300 is collected together with the OS information of the mobile terminal 300, so it is possible to timely acquire an error due to a version upgrade.

Next, description will be made on an update file transmission process for transmitting an update file to the mobile terminal 300 by the information communication system 10. In this case, the information management device 400 (actually, a server (control unit) that constitutes the information management device 400) serves as a control subject, and is able to execute the update file transmission process.

In the update file transmission process, when an error has occurred in cooperation between the in-vehicle device 200 and the mobile terminal 300, the information management device 400 receives error information about the error. Thus, the information management device 400 is able to timely acquire the error information.

In addition, the information management device 400 desirably determines that an error has occurred when the application software module of the mobile terminal 300 cannot be run in a state where the in-vehicle device 200 and the mobile terminal 300 are connected to each other. Thus, the information management device 400 is able to recognize that the error is due to the fact that the application software module of the mobile terminal 300 cannot be run.

The error information desirably includes version information at the time when an error has occurred in the system software module embedded in the mobile terminal in order to run the application software module. In addition, the information management device 400 desirably determines that the error is due to a version upgrade of the system software module when the version information included in the error information is newer than the version information acquired in advance for the system software module embedded in the mobile terminal 300. Thus, the information management device 400 is able to accurately determine that the error is due to a version upgrade.

As an alternative embodiment, the information management device 400 is able to determine that the error is due to a version upgrade of the system software module when the number of pieces of error information including the version information exceeds a predetermined number. When the number of pieces of error information is relatively large, it is highly likely that the error is due to a version upgrade. Thus, the information management device 400 is able to accurately determine that the error is due to a version upgrade.

The information management device 400 desirably creates an update file for updating the system software module using the error information including version information. Thus, it is possible to immediately create an update file after occurrence of an error has been detected.

The information management device 400 desirably transmits the created update file to the mobile terminal 300 associated with the error information. Thus, it is possible to immediately transmit the created update file to the predetermined mobile terminal 300, and, after that, it is possible to quickly carry out an update using the update file.

Figure 5:
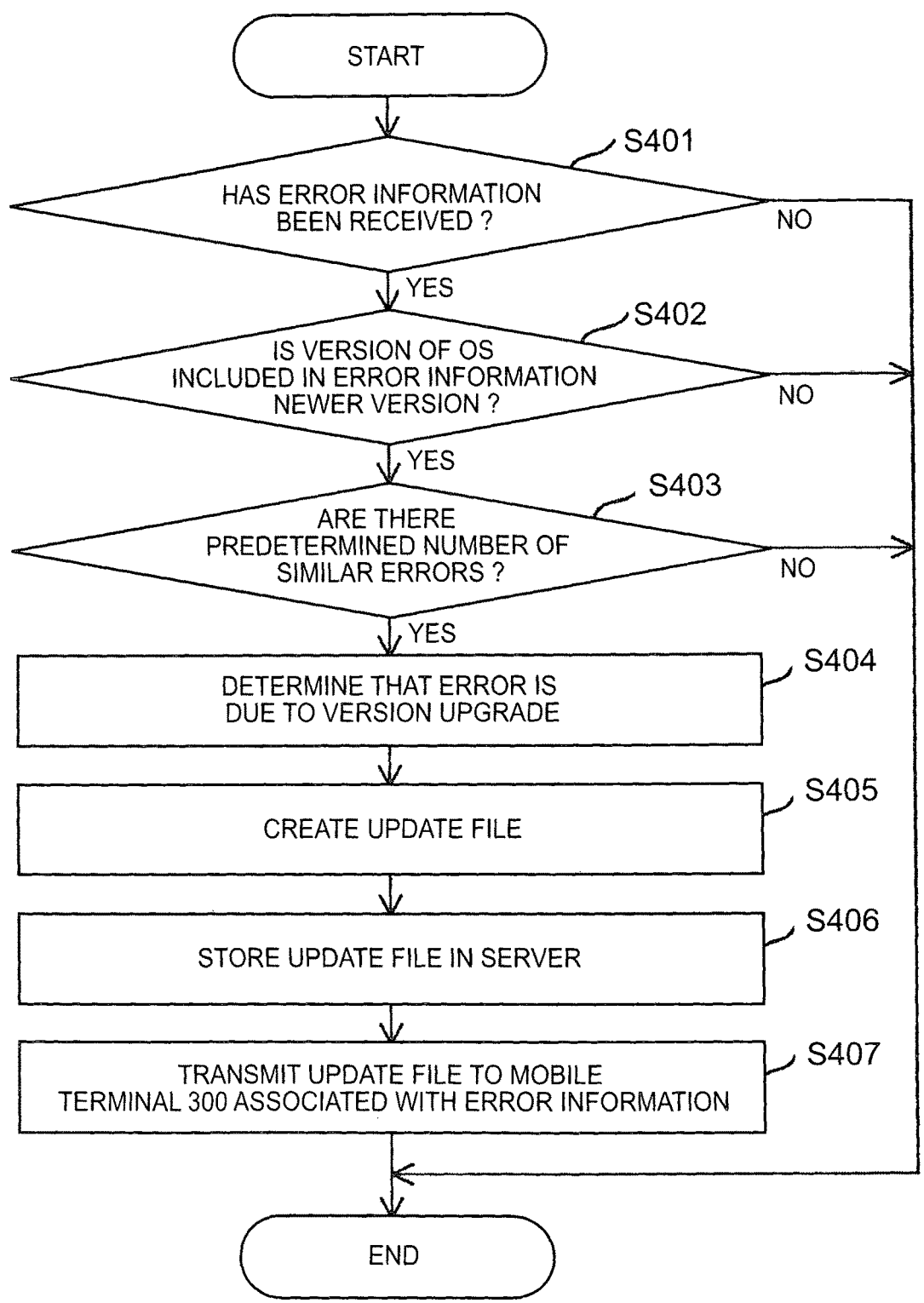
FIG. 5 is a flowchart for executing an update file transmission process by the information communication system.

FIG. 5 is referred to for specific steps of the above-described update file transmission process. As shown in the flowchart of FIG. 5, the process includes processes of step S401 to step S407. In this case, the information management device 400 serves as a control subject, and is able to execute the processes of the steps. On the other hand, at least one element appropriately selected from among the in-vehicle device 200, the mobile terminal 300 and the information management device 400 may be allocated to each step as a control subject.

In the process of step S401, it is determined whether the error information server 430 of the information management device 400 has received error information through the above-described process of step S310.

In the process of step S402, the OS information included in the error information received in step S401 is compared with the OS information of the mobile terminal 300, saved in advance in the OS information server 410. Thus, it is determined whether the version of the OS, associated with the error, is a newer version (that is, an unknown version) than the already registered version of the OS. When the condition of step S402 is satisfied (Yes in step S402), the process proceeds to step S403. On the other hand, when the condition of step S402 is not satisfied (No in step S402), the information acquisition process is ended.

In the process of step S403, it is determined whether the number of errors that satisfy the condition of step S402 is a predetermined number (for example, a multiple number). When the condition of step S403 is satisfied (Yes in step S403), the process proceeds to step S404. On the other hand, when the condition of step S403 is not satisfied (No in step S403), the information acquisition process is ended.

In the process of step S404, it is determined that the error associated with the error information received in step S401 is due to a version upgrade. Thus, it is possible to accurately detect that the error is due to a version upgrade. Particularly, as the version of the OS becomes newer and the number of similar errors increases, the accuracy of determination that the error is due to a version upgrade increases. As an alternative embodiment, it is applicable that the process of step S402 is omitted and then the process of step S404 is executed when only the condition of step S403 is satisfied. In addition, it is also applicable that the process of step S403 is omitted and then the process of step S404 is executed when only the condition of step S402 is satisfied.

In the process of step S405, an update file is created on the basis of the error information. Thus, an update file is automatically created immediately after determination that the error is due to a version upgrade.

In the process of step S406, the update file automatically created in the process of step S405 is stored in the update file server 420. Thus, the update file is immediately saved in the update file server 420.

In the process of step S407, the update file automatically created in the process of step S405 is transmitted to the mobile terminal 300 associated with the error information. Thus, the transmission file is transmitted to the mobile terminal 300 that is a transmission source from which the error information has been transmitted, so it is possible to immediately execute the process of updating the version of the OS of the mobile terminal 300.

With the above-described update file transmission process, the update file is created by analyzing the error in the information management device 400, so it is possible to automatically create an update file and then to distribute the update file to the predetermined mobile terminal 300.

The invention is not limited to only the above-described typical embodiment. Various applications or modifications are conceivable. For example, the following embodiments to which the above-described embodiment is applied may be implemented.

In the invention, the four processes, that is, the first updating process shown in FIG. 2, the second updating process shown in FIG. 3, the error information transmission process shown in FIG. 4 and the update file transmission process shown in FIG. 5, each may be executed solely or at least two of the four processes may be executed in combination.

In the above-described embodiment, the updating process for the system software modules (OS) respectively embedded in the in-vehicle device 200 and the mobile terminal 300 is described; however, the invention may also be applied to an updating process for an application software module for carrying out a job that the user desires to run in the in-vehicle device 200 or the mobile terminal 300.

Specifically, on the basis of the above-described embodiment and various alternative embodiments, the following embodiment may be employed in the invention.

In a software updating method according to an embodiment of the invention, when a first software module embedded in a mobile terminal connected to an in-vehicle device mounted on a vehicle so as to be able to cooperate with the in-vehicle device has been updated, a second software module embedded in the in-vehicle device is updated on the basis of software information about the updated first software module.

In the above embodiment, when the software information about the first software module embedded in the mobile terminal is received and an update of the first software module has been detected using the received software information, an update file for updating the second software module may be transmitted to the in-vehicle device in correspondence with the software information about the updated first software module.

In the above embodiment, the software information about the first software module received by the in-vehicle device from the mobile terminal may be received from the in-vehicle device during connection between the in-vehicle device and the mobile terminal.

In the above embodiment, the software information about the first software module, received from the in-vehicle device, may be stored in association with the in-vehicle device.

In the above embodiment, the software information about the first software module may be received from the mobile terminal on the condition that a launch of a predetermined application embedded in the mobile terminal has been completed.

In the above embodiment, the update file received by the in-vehicle device may be installed into the in-vehicle device when a predetermined condition is satisfied.

In the above embodiment, the update file may be transmitted to the mobile terminal when information communication between the information management device and the in-vehicle device is disabled, the update file may be transmitted to the in-vehicle device when the mobile terminal and the in-vehicle device are connected to each other, and the update file received by the in-vehicle device may be installed into the in-vehicle device when a predetermined condition is satisfied.

In the above embodiment, when the update file has downward compatibility, it may be determined that the predetermined condition is satisfied.

In the above embodiment, when the vehicle on which the in-vehicle device is mounted is in a stopped state, it may be determined that the predetermined condition is satisfied.

The invention claimed is:

1. An information management device connected via a communication line to at least one of an in-vehicle device mounted on a vehicle and a mobile terminal connected to the in-vehicle device so as to be able to cooperate with the in-vehicle device, the information management device comprising:
   a central processing unit configured to:
     when a first software module embedded in the mobile terminal has been updated, update a second software module embedded in the in-vehicle device on the basis of software information about the updated first software module;
     receive the software information about the updated first software module embedded in the mobile terminal on a condition that a launch of a predetermined application software module embedded in the mobile terminal has been completed; and
     when the update of the first software module has been detected using the received software information, transmit an update file for updating the second software module to the in-vehicle device in correspondence with the software information about the updated first software module,
   wherein the first software module includes an operating system required during operation of the mobile terminal.

2. The information management device according to claim 1, wherein the central processing unit is configured to receive the software information about the updated first software module from the in-vehicle device, the software information having been received by the in-vehicle device from the mobile terminal during a connection between the in-vehicle device and the mobile terminal.

3. The information management device according to claim 2, wherein the central processing unit is configured to store the software information about the updated first software module in association with the in-vehicle device, the software information having been received from the in-vehicle device during the connection between the in-vehicle device and the mobile terminal.

4. An information communication system comprising:
   an in-vehicle device mounted on a vehicle;
   a mobile terminal connected to the in-vehicle device so as to be able to cooperate with the in-vehicle device; and
   an information management device connected via a communication line to at least one of the in-vehicle device and the mobile terminal, wherein
   when a first software module embedded in the mobile terminal has been updated, a second software module embedded in the in-vehicle device is updated on the basis of software information about the updated first software module,
   the information management device is configured to:
     receive the software information about the updated first software module on a condition that a launch of a predetermined application software module embedded in the mobile terminal has been completed; and
     when the update of the first software module has been detected using the received software information, transmit an update file for updating the second software module to the in-vehicle device in correspondence with the software information about the updated first software module,
   the first software module includes an operating system required during operation of the mobile terminal.

5. The information communication system according to claim 4, wherein
   the in-vehicle device is configured to receive the software information about the updated first software module from the mobile terminal during a connection with the mobile terminal, and
   the information management device is configured to receive the software information about the updated first software module from the in-vehicle device, the software information having been received by the in-vehicle device from the mobile terminal.

6. The information communication system according to claim 5, wherein the information management device is configured to store the software information about the updated first software module in association with the in-vehicle device, the software information having been received from the in-vehicle device.

7. The information communication system according to claim 4, wherein the in-vehicle device is configured to, when a predetermined condition is satisfied, install the update file received from the information management device.

8. The information communication system according to claim 7, wherein the in-vehicle device is configured to, when the update file has downward compatibility, determine that the predetermined condition is satisfied.

9. The information communication system according to claim 7, wherein the in-vehicle device is configured to, when the update file has downward compatibility and the vehicle on which the in-vehicle device is mounted is in a stopped state, determine that the predetermined condition is satisfied.

10. The information communication system according to claim 4, wherein
   the information management device is configured to transmit the update file to the mobile terminal when information communication with the in-vehicle device is disabled,
   the mobile terminal is configured to, when connected to the in-vehicle device, transmit the update file to the in-vehicle device, the update file having been received from the information management device, and
   the in-vehicle device is configured to, when a predetermined condition is satisfied, install the update file received from the mobile terminal.

\* \* \* \* \*